Aug. 22, 1939.  S. A. COGSDILL  2,170,631
BEARINGIZING TOOL
Filed March 25, 1938

INVENTOR
STUART A. COGSDILL
BY
ATTORNEYS

Patented Aug. 22, 1939

2,170,631

UNITED STATES PATENT OFFICE 2,170,631

BEARINGIZING TOOL

Stuart A. Cogsdill, Detroit, Mich., assignor to Cogsdill Twist Drill Company, Inc., Detroit, Mich., a corporation of Michigan Application March 25, 1938, Serial No. 198,150

5 Claims. (Cl. 29—90)

The invention relates to bearingizing tools for processing work, such as bearings, guides and the like.

The invention has for one of its objects to provide a bearingizing tool which is adjustable so that it can process the work accurately to desired dimension. The invention has for another object to so construct the bearingizing tool that its parts for subjecting the work to impacts are removable and may be replaced.

The invention has for further objects the novel arrangements and combinations of parts as more fully hereinafter set forth.

Figure 1:
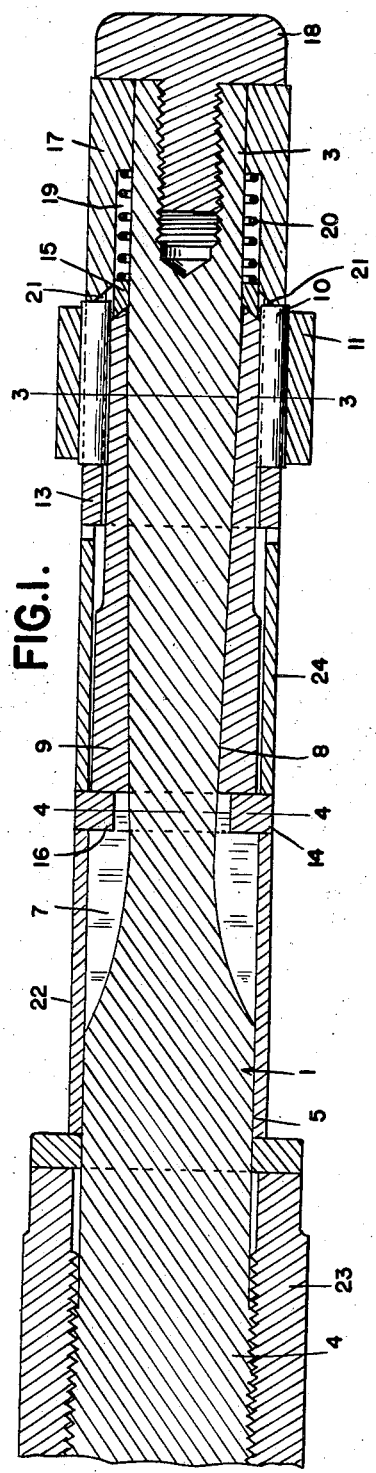
Figure 1 is a central axial section of a bearingizing tool showing an embodiment of my invention.
Figure 2:
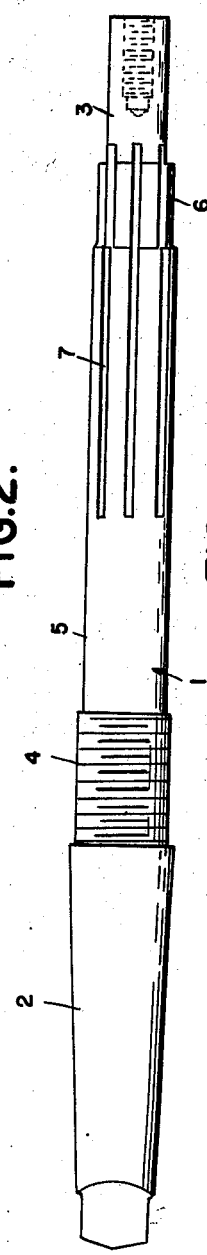
Figure 2 is an elevation of the arbor thereof.
Figure 3:
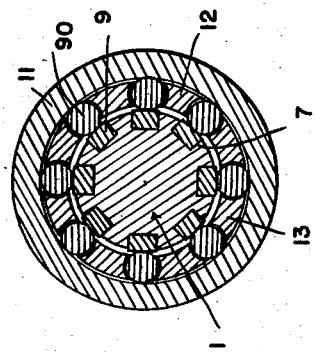
Figure 4:
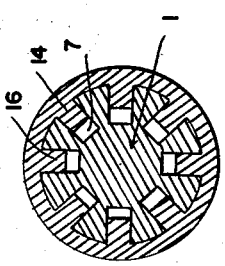

Figures 3 and 4 are cross sections on the lines 3—3 and 4—4 respectively of Figure 1.

The bearingizing tool has the arbor 1 which is revoluble and is provided with the tapered end portion 2 for fitting in the socket of a revoluble machine spindle which is preferably rotated at relatively high speed. The arbor also has the cylindrical end portion 3. The arbor further has intermediate the end portions 2 and 3 the threaded portion 4 adjacent to and of a smaller diameter than the adjacent end of the portion 2, the cylindrical portion 5 adjacent to and of a smaller diameter than the threaded portion 4, and the cylindrical portion 6 adjacent to and of a smaller diameter than the portion 5, the portion 6 being adjacent to and of greater diameter than the end portion 3. The portion 6 and the major part of the portion 5 adjacent the portion 6 are provided with the angularly spaced axially extending slots 7, the bottoms 8 of which are inclined from near their inner ends to their outer ends, their outer ends merging into the external surface of the end portion 3.

9 are cam members preferably formed of hardened steel and extending within the slots 7. These cam members are generally wedge-shaped axially so that their outer surfaces are parallel to the axis of the arbor when their inner surfaces are in engagement with the bottoms 8 of the slots. The outer surfaces of the cam members are also arcuate to be concentric with the arbor. Furthermore, the inner end portions of the cam members are of greater radial depth than the outer end portions and the outer ends of the cam members preferably terminate in bevels.

10 are the processing members engageable with the work 11. These processing members are preferably an annular series of angularly spaced axially extending cylindrical rolls corresponding in number to the cam members. The rolls are angularly positioned between the tongues 12 of the cage 13, the openings between the tongues being such that the rolls are held from radial disengagement therefrom but are permitted to move radially relative thereto. The rolls have a diameter greater than the radial thickness of the tongues. The cage is positioned by its annular or solid portion abutting the shoulder formed between the portions 5 and 6 and the internal diameter of the cage provides sufficient clearance for the cam members to extend radially outwardly beyond the portion 6 to thereby engage the rolls upon rotation of the arbor.

14 and 15 are collars respectively at the inner and outer ends of the cam members 9, the collar 15 being preferably beveled to provide a portion cooperating with and overhanging the outer beveled ends of the cam members to assist in normally holding these cam members against the bottoms 8 of the grooves in the arbor. The collar 14 is sleeved upon the cylindrical portion 5 and has the fingers 16 which extend into the slots 7. The collar 15 is sleeved upon the cylindrical end portion 3 and is adapted to extend within the cage 13 and to abut the shoulder formed between this end portion and the cylindrical portion 6. 17 is a pilot sleeve also adapted to be sleeved upon the cylindrical end portion 3 and adapted to be held thereon by suitable means such as the screw 18 threadedly engaging the end portion. The pilot sleeve 17 is formed with the annular recess 19 within which is located the coil spring 20 adapted to abut the collar 15 and the shoulder formed at the end of the recess. The inner end of this sleeve is preferably beveled to fit over the beveled axially extending projections 21 upon the ends of the tongues 12 of the cage to thereby serve in positioning the cage upon the arbor.

For axially adjusting the cam members 9 to thereby radially adjust the same, I have provided the sleeve 22 encircling the cylindrical portion 5 and abutting the collar 14 and also the internally threaded collar 23 engaging the threaded portion 4 of the arbor.

24 is a sleeve encircling the cylindrical portion 5 and serving to prevent accidental disengagement of the cam members from their slots. The length of this sleeve is such that it provides for the required amount of turning of the collar 23 to secure the desired axial adjustment of the members.

From the above description, it will be seen that the processing rolls and the cam members are formed of separate parts and may be readily removed respectively from the cage and the arbor and replaced. It will also be seen that the cam members may be readily adjusted to force the rolls radially outwardly the desired distance to accurately process the work to desired dimension. Furthermore, that in operation and during the rotation of the arbor at relatively high speed the cam members successively contact with the rolls to deliver a series of impacts to the work and that after each impact the work is temporarily rolled by reason of the rolls engaging the arcuate outer faces of the cam members. As a result, the surface of the work acted upon will be formed to accurate size and will be highly finished and its hardness will be increased.

What I claim as my invention is:

1. A bearingizing tool comprising a revoluble arbor having a series of angularly spaced slots formed with inclined bottoms, cam members in said slots and adjustable relative to said arbor, a series of angularly spaced processing rolls encircling said arbor and adapted to be engaged by said cam members to be forced outwardly thereby into engagement with the work to deliver a series of impacts thereto, and means for adjusting said cam members relative to said arbor.

2. A bearingizing tool comprising a revoluble arbor having a series of angularly spaced axially extending grooves with inclined bottoms, cam members within said grooves and adjustable axially relative to said arbor, a series of angularly spaced axially extending processing rolls encircling said arbor and adapted to be forced outwardly into engagement with the work by said cam members, a cage for said processing rolls providing for relative radial movement thereof, and means upon said arbor for axially adjusting said cam members.

3. A bearingizing tool comprising a revoluble arbor having a series of angularly spaced axially extending grooves with inclined bottoms, cam members extending within said grooves and adjustable axially relative to said arbor, means resiliently urged against said cam members and co-operating therewith to hold the same from accidental outward movement, a series of angularly spaced axially extending processing rolls encircling said arbor, a cage for said rolls providing for relative radial movement thereof, a collar upon said arbor having fingers extending into said grooves and engageable with said cam members, and means adjustable axially of said arbor and engageable with said collar to axially adjust said cam members to thereby cause a radial adjustment thereof relative to said arbor.

4. A bearingizing tool comprising a revoluble arbor having a plurality of angularly spaced slots formed therein, cam members in said slots adapted to be adjusted relative to said arbor, a plurality of angularly spaced processing rolls encircling said arbor and adapted to be intermittently engaged by said cam members upon rotation of said arbor to be forced outwardly into engagement with the work for delivering a series of impacts to the latter, and means for adjusting said cam members relative to said arbor.

5. A bearingizing tool comprising a revoluble arbor having a plurality of angularly spaced slots formed therein, cam members in said slots having arcuate outer surfaces concentric with the axis of said arbor, a plurality of angularly spaced work processing rolls encircling said arbor and adapted to be intermittently engaged by the outer surfaces of said cam members upon rotation of said arbor to deliver a series of impacts to the work upon initial engagement of the cam members with the rolls and to temporarily roll the work upon subsequent movement of the arcuate surfaces of the cam members over said rolls.

STUART A. COGSDILL.